(12) United States Patent
Matsuyama

(10) Patent No.: US 8,009,967 B2
(45) Date of Patent: Aug. 30, 2011

(54) INFORMATION PROCESSING APPARATUS, INFORMATION PROCESSING METHOD, AND PROGRAM

(75) Inventor: Hiroyuki Matsuyama, Tokyo (JP)

(73) Assignee: Sony Corporation, Tokyo (JP)

(*) Notice: Subject to any disclaimer, the term of this patent is extended or adjusted under 35 U.S.C. 154(b) by 971 days.

(21) Appl. No.: 11/204,043

(22) Filed: Aug. 16, 2005

(65) Prior Publication Data

US 2006/0041911 A1  Feb. 23, 2006

(30) Foreign Application Priority Data

Aug. 18, 2004  (JP) ................ P2004-238228

(51) Int. Cl.
*H04N 5/76* (2006.01)
(52) U.S. Cl. ........ 386/297; 386/238; 386/248; 348/460; 725/39; 725/58; 725/86
(58) Field of Classification Search .......... 386/46, 386/83, 200, 212, 213, 235, 238, 239, 248, 386/262, 291–299, 326; 725/37–47, 52, 725/58, 61, 86, 91; 455/3.01–3.06; 348/460, 348/705
See application file for complete search history.

(56) References Cited

U.S. PATENT DOCUMENTS

| | | | | |
|---|---|---|---|---|
| 5,285,265 A | * | 2/1994 | Choi | 348/565 |
| 5,631,743 A | * | 5/1997 | Inoue | 386/239 |
| 5,659,653 A | * | 8/1997 | Diehl et al. | 386/46 |
| 5,963,264 A | * | 10/1999 | Jackson | 348/460 |
| 6,344,878 B1 | * | 2/2002 | Emura | 348/460 |
| 6,751,401 B1 | * | 6/2004 | Arai et al. | 386/83 |
| 7,088,952 B1 | * | 8/2006 | Saito et al. | 455/3.06 |
| 2003/0069964 A1 | * | 4/2003 | Shteyn et al. | 709/225 |
| 2004/0001690 A1 | * | 1/2004 | Boston et al. | 386/46 |
| 2004/0043724 A1 | * | 3/2004 | Weast | 455/3.01 |
| 2009/0293089 A1 | * | 11/2009 | Taylor et al. | 725/53 |

FOREIGN PATENT DOCUMENTS

| | | |
|---|---|---|
| EP | 0 424 725 A | 5/1991 |
| GB | 2 229 595 | 9/1990 |
| JP | 2000-123440 | * 4/2000 |
| JP | 2003-134429 | 5/2003 |
| JP | 2003-134431 | 5/2003 |
| JP | 2004-032128 | 1/2004 |
| JP | 2004-363647 | 12/2004 |
| WO | WO 91/08626 A | 6/1991 |

* cited by examiner

*Primary Examiner* — Thai Tran
*Assistant Examiner* — Mishawn Dunn
(74) *Attorney, Agent, or Firm* — Finnegan, Henderson, Farabow, Garrett & Dunner, L.L.P.

(57) ABSTRACT

An information processing apparatus includes a reservation unit reserving predetermined processing for a broadcast program, the predetermined processing being started in accordance with conditions corresponding to program information concerning the broadcast program; a processing unit starting the processing, reserved by the reservation unit, for the broadcast program in accordance with the conditions; and an acquiring unit acquiring the program information. The reservation unit obtains program information concerning another broadcast program for which the processing is reserved and which is to be broadcasted subsequent to the broadcast program, the program information being acquired by the acquiring unit, if the processing reserved for the broadcast program is started by the processing unit. The reservation unit changes the conditions of the processing reserved for the other broadcast program in accordance with the obtained program information concerning the other broadcast program.

6 Claims, 5 Drawing Sheets

INFORMATION PROCESSING APPARATUS, INFORMATION PROCESSING METHOD, AND PROGRAM

CROSS REFERENCES TO RELATED APPLICATIONS

The present invention contains subject matter related to Japanese Patent Application JP 2004-238228 filed in the Japanese Patent Office on Aug. 18, 2004, the entire contents of which are incorporated herein by reference.

BACKGROUND OF THE INVENTION

1. Field of the Invention

The present invention relates to information processing apparatuses, information processing methods, and programs. Particularly, the present invention relates to an information processing apparatus, an information processing method, and a program which are capable of appropriate recording reservation of a plurality of programs.

2. Description of the Related Art

Recording-playback apparatuses that record and play back television (TV) programs on recording media, such as hard disks or optical disks, have been developed. Presetting such recording-playback apparatuses to record TV programs (reserving the TV programs to be recorded by the recording-playback apparatuses) allows users to watch the TV programs after the TV programs were broadcasted, for example, even if the users were away from home during the broadcasting time.

There are cases where the program precedent to a reservation program (for example, a live program of a sports game, such as baseball or soccer) is extended and the broadcasting start time of the reservation program is delayed.

In such cases, the recording-playback apparatus starts to record the TV program which is actually broadcasted in the corresponding channel (the TV program precedent to a reservation program) on the recording media at the recording start time of the reservation program, and terminates the recording of the reservation program at a time when the broadcasting of the reservation program has not been completed (at the recording end time). As a result, it may be impossible to appropriately record the reservation program.

For example, Japanese Unexamined Patent Application Publication No. 2004-032128 discloses a reservation method for digital TV broadcast programs, described below with reference to FIG. 1.

In the example shown in FIG. 1, recording of a program B1 in a predetermined channel in which programs are to be broadcasted according to a schedule shown in FIG. 1(A) is reserved. However, since a program A precedent to the program B1 is extended as shown in FIG. 1(B), the broadcasting start time of the program B1 is changed from a time tS1 to a time tS1".

A recording-playback apparatus stores identification information (ID) (EventID) of the reservation program B1, the recording start time and end time corresponding to the broadcasting start time and the program length of the program B1, and so on in the reservation.

The recording-playback apparatus selects a channel of the program B1 at a time t0 a predetermined time before the recording start time tS1 of the program B1. The recording-playback apparatus starts to acquire an event information table EIT[P] and an EIT[F] from a broadcast signal and to determine whether the ID of the program B1 is included in the EIT[P] and the EIT[F].

The EITs are included in service information transmitted along with video and audio transport streams of a program. The EITs include the EIT[P] in which the name, the content, the broadcasting start time, and the program length (hereinafter collectively referred to as program information when it is not necessary to differentiate them) of a program currently broadcasted are described and the EIT[F] in which the program information of a program to be subsequently broadcasted is described.

Referring to FIG. 1(B), since the program A is continued to be broadcasted at the time tS1 when the program B1 is scheduled to be broadcasted, the EIT[P] includes the ID of the program A and does not include the ID of the program B1. The EIT[F] is made indeterminate when the extension of the program A is determined, and is changed (fixed) at predetermined timing (at a predetermined time after the broadcasting start time tS1).

Specifically, since the ID of the program B1 is not set in the EIT[P] and the EIT[F] at the time tS1 in FIG. 1(B), the recording-playback apparatus does not start to record the program B1. After the ID of the program B1 is set in the EIT[F], the recording-playback apparatus changes the recording start time from the time tS1 to the time tS1" based on the broadcasting start time tS1" of the program B1, set in the EIT[F]. At a time tS1' a predetermined time before the time tS1", the recording-playback apparatus starts to acquire the EIT[P] and the EIT[F] and to determine whether the ID of the program B1 is included in the EIT[P] and the EIT[F].

Since the EIT[P] having the ID of the program B1 set therein is acquired at the time tS1", the recording-playback apparatus starts to record the program B1 at the time tS1". As a result, the program B1 is recorded on the recording medium in the recording-playback apparatus, as shown in FIG. 1(C).

SUMMARY OF THE INVENTION

The programs are recorded in the manner shown in FIG. 1 when the recording of one program is reserved. In contrast, the following problem is caused when the recording of two or more programs are reserved.

For example, when the recording of the program B1 is started in the manner described above where the recording of the program B1 and a program B2 are to be reserved in the example shown in FIG. 1, the acquisition of the EITs and the determination of whether the ID of the program B2 is set are not performed during a period from the time tS1" to a time tE2". As a result, since the recording of the program B1 is completed (at the time tE2") after a recording end time tE2' of the program B2, which is set in the reservation, it is presumed that the program B2 is completed. Consequently, the reserved-recording of the program B2 is cancelled and the program B2 is not recorded.

It is desirable to perform appropriate recording reservation of a plurality of programs in digital TV broadcasting.

According to an embodiment of the present invention, there is provided an information processing apparatus including reservation means for reserving predetermined processing for a digital television broadcast program, the predetermined processing being started in accordance with conditions corresponding to a broadcast schedule of the digital television broadcast program; processing means for starting the processing, reserved by the reservation means, for the digital television broadcast program in accordance with the conditions; and acquiring means for acquiring the broadcast schedule of the digital television broadcast program. The reservation means obtains a broadcast schedule of another digital television broadcast program for which the processing is reserved and which is to be broadcasted subsequent to the digital television broadcast program, the broadcast schedule being acquired by the acquiring means, when the processing reserved for the digital television broadcast program is started by the processing means. The reservation means changes the conditions of the processing reserved for the other digital television broadcast program in accordance with the obtained broadcast schedule.

According to an embodiment of the present invention, there is provided an information processing method including the steps of reserving in advance predetermined processing for a digital television broadcast program, the predetermined processing being started in accordance with conditions corresponding to a broadcast schedule of the digital television broadcast program; starting the processing, reserved in the reserving step, for the digital television broadcast program in accordance with the conditions; and acquiring the broadcast schedule of the digital television broadcast program. A broadcast schedule of another digital television broadcast program for which the processing is reserved and which is to be broadcasted subsequent to the digital television broadcast program, the broadcast schedule being acquired in the acquiring step, is obtained in the reserving step when the processing reserved for the digital television broadcast program is started. The conditions of the processing reserved for the other digital television broadcast program are changed in the reserving step in accordance with the obtained broadcast schedule.

According to an embodiment of the present invention, there is provided a program causing a computer to perform information processing including the steps of reserving in advance predetermined processing for a digital television broadcast program, the predetermined processing being started in accordance with conditions corresponding to a broadcast schedule of the digital television broadcast program; starting the processing, reserved in the reserving step, for the digital television broadcast program in accordance with the conditions; and acquiring the broadcast schedule of the digital television broadcast program. A broadcast schedule of another digital television broadcast program for which the processing is reserved and which is to be broadcasted subsequent to the digital television broadcast program, the broadcast schedule being acquired in the acquiring step, is obtained in the reserving step when the processing reserved for the digital television broadcast program is started. The conditions of the processing reserved for the other digital television broadcast program are changed in the reserving step in accordance with the obtained broadcast schedule.

In the information processing apparatus, the information processing method, and the program according to the embodiments of the present invention, predetermined processing for a digital television broadcast program is reserved in advance, the predetermined processing being started in accordance with conditions corresponding to a broadcast schedule of the digital television broadcast program; the reserved processing is started for the digital television broadcast program in accordance with the conditions; and the broadcast schedule of the digital television broadcast program is acquired. When the processing reserved for the digital television broadcast program is started, an acquired broadcast schedule of another digital television broadcast program for which the processing is reserved and which is to be broadcasted subsequent to the broadcast program is obtained. The conditions of the processing reserved for the other digital television broadcast program are changed in accordance with the obtained broadcast schedule.

According to the present invention, it is possible to perform appropriate recording reservation of a plurality of programs in the digital television broadcasting.

DESCRIPTION OF THE PREFERRED EMBODIMENTS

The relationship between the invention described in this specification and the embodiments is described next. The following description is intended to confirm whether the embodiments supporting the invention in the specification are described in the specification. Accordingly, even when some embodiments are described in the embodiments but not described in the following description as the elements of the present invention, it does not mean that the embodiments do not correspond to the invention. Conversely, even when embodiments are described in the following description as the elements of the present invention, it does not mean that the embodiments do not correspond to other elements of the invention.

In addition, the following description does not mean the entire invention described in the specification. In other words, the following description does not imply denial of the presence of the invention that is described in the specification but is not described in the claims, that is, of the presence of the invention that is to be filed as a divisional application or that is to be appended as an amendment.

According to an embodiment, the present invention provides an information processing apparatus including a reservation unit (for example, a reservation unit 52 in FIG. 3) for reserving predetermined processing for a digital television broadcast program, the predetermined processing being started in accordance with conditions corresponding to a broadcast schedule of the digital television broadcast program; a processing unit (for example, a reservation processor unit 53 in FIG. 3) for starting the processing, reserved by the reservation unit, for the digital television broadcast program in accordance with the conditions; and an acquiring unit (for example, an EIT acquiring unit 51 in FIG. 3) for acquiring the broadcast schedule of the digital television broadcast program. The reservation unit obtains a broadcast schedule of another digital television broadcast program for which the processing is reserved and which is to be broadcasted subsequent to the digital television broadcast program, the broadcast schedule being acquired by the acquiring unit, when the processing reserved for the digital television broadcast program is started by the processing unit. The reservation unit changes the conditions of the processing reserved for the other digital television broadcast program in accordance with the obtained broadcast schedule.

Figure 4:
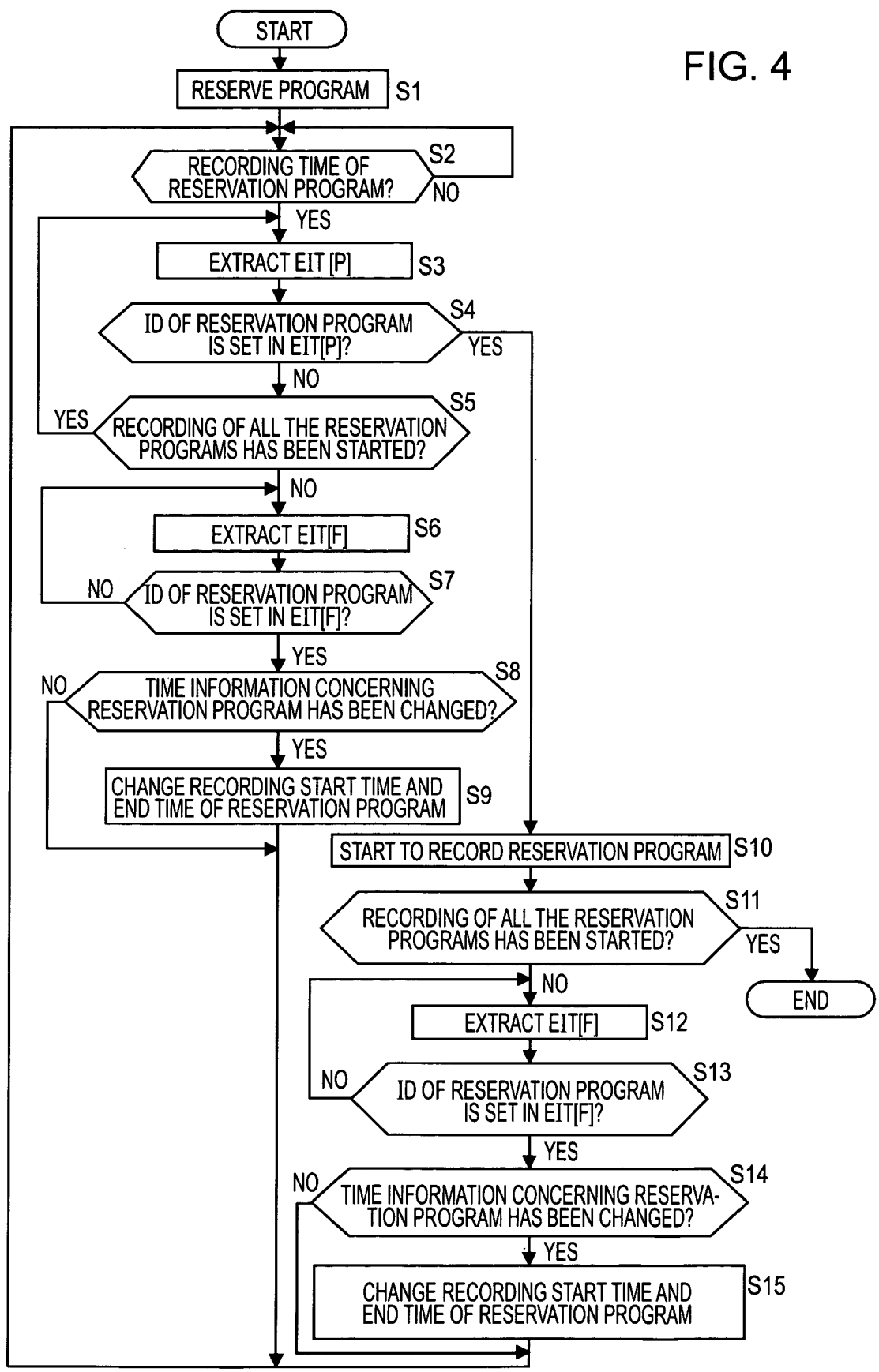
FIG. 4 is a flowchart illustrating a recording reservation process in the recording-playback apparatus in FIG. 3.

According to another embodiment, the present invention provides an information processing method including the steps of reserving in advance predetermined processing for a digital television broadcast program, the predetermined processing being started in accordance with conditions corresponding to a broadcast schedule of the digital television broadcast program (for example, Step S1 in FIG. 4); starting the processing, reserved in the reserving step, for the digital television broadcast program in accordance with the conditions (for example, Step S10 in FIG. 4); and acquiring the broadcast schedule of the digital television broadcast program (for example, Steps S3, S6, and S11 in FIG. 4). A broadcast schedule of another digital television broadcast program for which the processing is reserved and which is to be broadcasted subsequent to the digital television broadcast program, the broadcast schedule being acquired in the acquiring step, is obtained in the reserving step (for example, Step S12 in FIG. 4) when the processing reserved for the digital television broadcast program is started (for example, Step S10 in FIG. 4). The conditions of the processing reserved for the other digital television broadcast program are changed in the reserving step in accordance with the obtained broadcast schedule (for example, Step S15 in FIG. 4).

Figure 1:
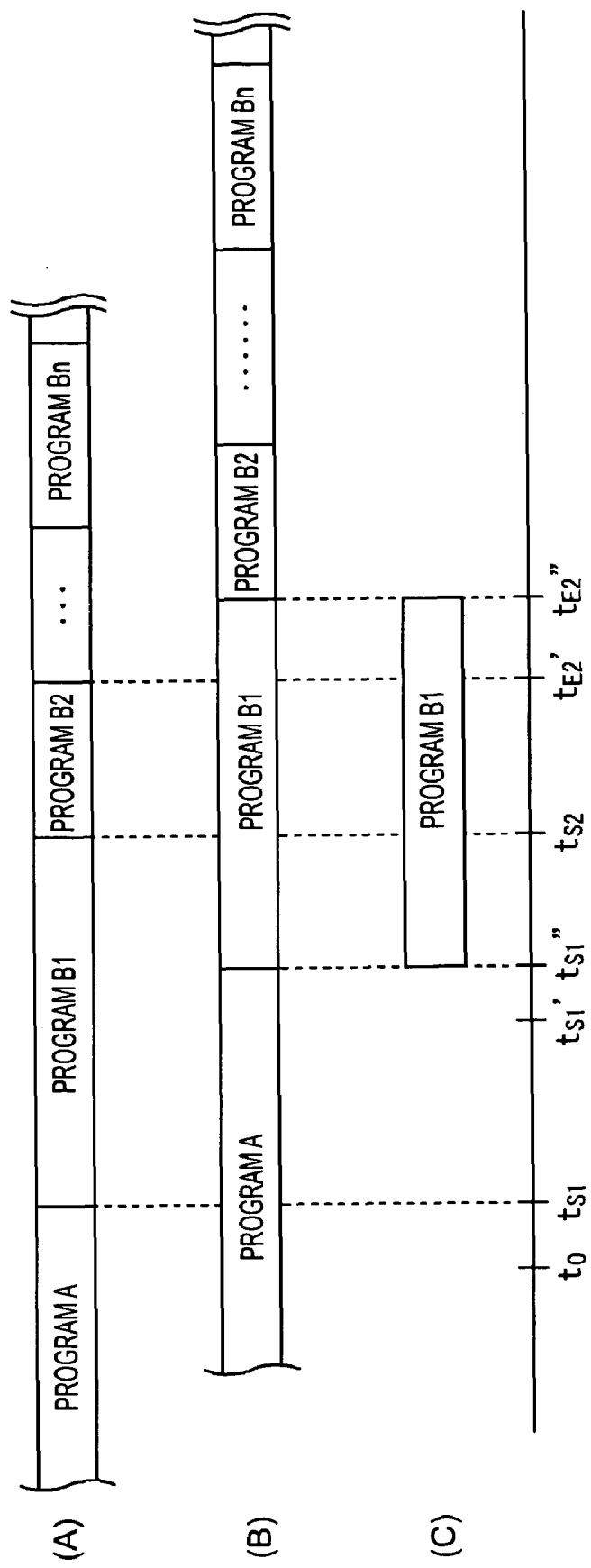
FIG. 1 illustrates a recording reservation method in related art.
Figure 2:
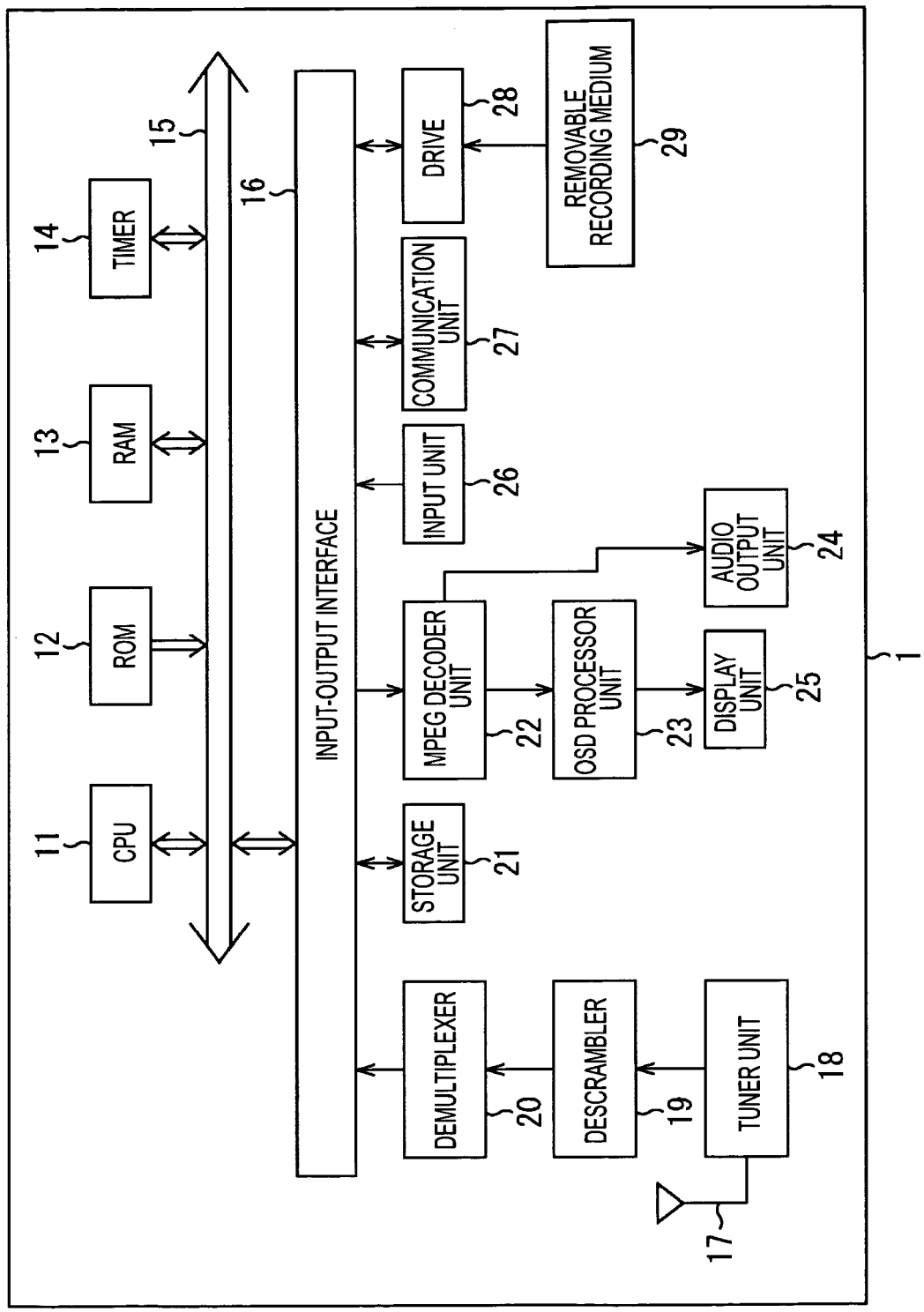
FIG. 2 is a block diagram showing an example of the structure of a recording-playback apparatus according to an embodiment of the present invention.

FIG. 2 shows an example of the structure of a recording-playback apparatus 1 according to an embodiment of the present invention.

Referring to FIG. 2, a central processing unit (CPU) 11 performs a variety of processing in accordance with programs recorded in a read only memory (ROM) 12 or programs that are supplied from a storage unit 21 and are loaded in a random access memory (RAM) 13. The RAM 13 also stores data necessary for the CPU 11 to perform the variety of processing.

The CPU 11, the ROM 12, the RAM 13, and a timer 14 counting a time are connected to each other via a bus 15. An input-output interface 16 is also connected to the bus 15.

A demultiplexer 20, a moving picture experts group (MPEG) decoder unit 22, and the storage unit 21, which is, for example, a hard disk, are connected to the input-output interface 16.

A tuner unit 18 receives a digital TV broadcast program transmitted from a channel specified by a user (a TV station corresponding to the specified channel), among a plurality of channels, through an antenna 17 and supplies the received digital TV broadcast program to a descrambler 19.

The descrambler 19 descrambles the transport stream supplied from the tuner unit 18, if necessary, and supplies the descrambled transport stream to the demultiplexer 20.

The demultiplexer 20 isolates a video packet and an audio packet of a desired program from the transport stream supplied from the descrambler 19 and supplies the isolated video packet and audio packet to the MPEG decoder unit 22 through the input-output interface 16.

The MPEG decoder unit 22 decodes the supplied packets in an MPEG format and converts the decoded packets into analog signals (a video signal and an audio signal). The MPEG decoder unit 22 supplies the generated video signal to an on screen display (OSD) processor unit 23 and supplies the generated audio-signal to an audio output unit 24. In addition, the MPEG decoder unit 22 acquires service information (SI) from the supplied packets and supplies the SI to the CPU 11.

The OSD processor unit 23 superimposes required information on the supplied analog video signal and supplies the superimposed signal to a display unit 25. The display unit 25 displays the supplied video signal as a video. The audio output unit 24 outputs the audio signal corresponding to the video (the audio signal supplied from the MPEG decoder unit 22) as a sound.

An input unit 26 with which the user inputs instructions and a communication unit 27 used for communication over a network, including the Internet, are also connected to the input-output interface 16.

A drive 28 is connected to the input-output interface 16, if necessary. A removable recording medium 29, such as a magnetic disk, an optical disk, a magneto-optical disk, or a semiconductor memory, is appropriately loaded in the drive 28. Computer programs read out from the removable recording medium 29 are installed in the storage unit 21, if necessary.

The recording-playback apparatus 1 is not limited to a so-called hard disk recording apparatus and may be any apparatus capable of performing the process described below. For example, the present invention is applicable to, for example, a digital versatile disk (DVD) recorder or a video cassette recorder.

Figure 3:
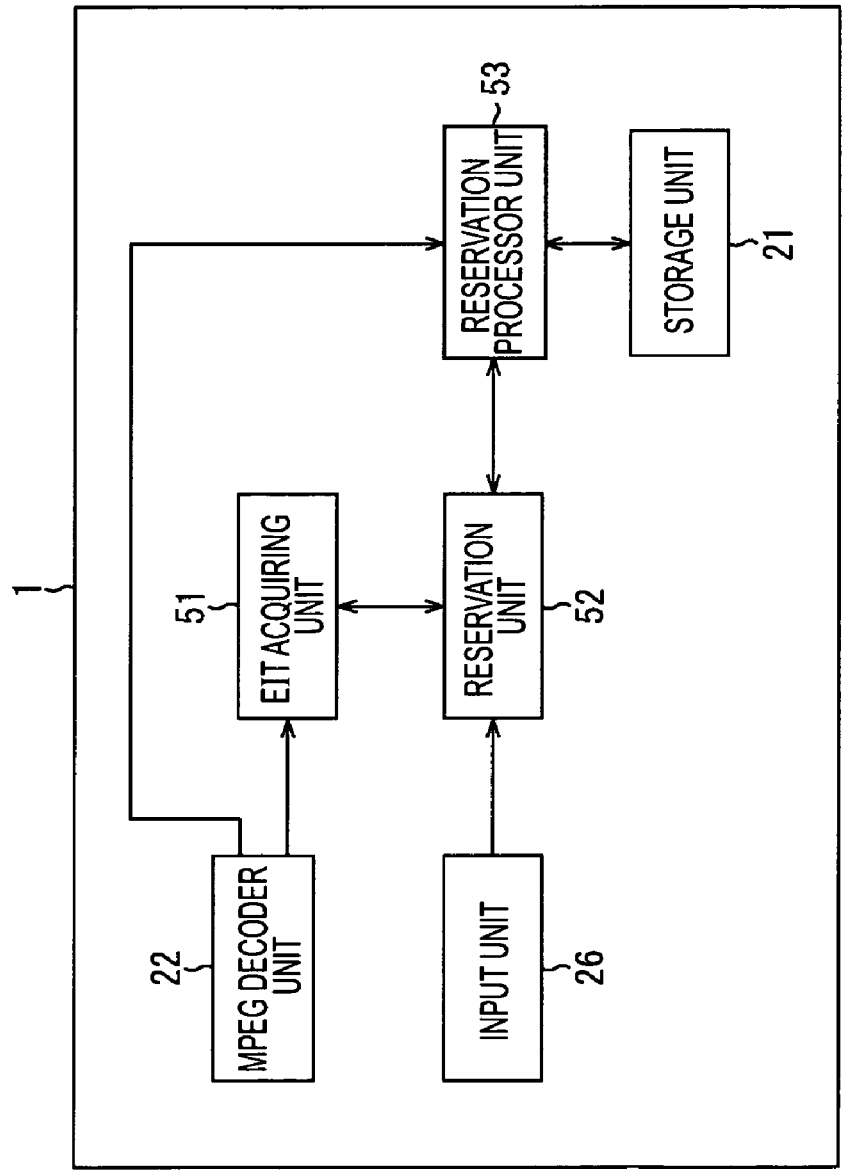
FIG. 3 is a block diagram showing an example of the functional structure of part of the recording-playback apparatus according to the embodiment of the present invention.

FIG. 3 shows an example of the functional structure of part of the recording-playback apparatus 1 according to the embodiment of the present invention.

Referring to FIG. 3, the SI is supplied from the MPEG decoder unit 22 to an EIT acquiring unit 51 (realized by the components from the CPU 11 to the RAM 13) along with the video and audio transport streams of a TV broadcast program. The EIT acquiring unit 51 acquires an EIT from the supplied SI and supplies the acquired EIT to a reservation unit 52.

The reservation unit 52 (realized by the components from the CPU 11 to the timer 14) stores the channel and the recording start and end times of the program which is supplied from the input unit 26 and for which the recording is reserved by the user to reserve the recording of the program.

The reservation unit 52 appropriately changes the recording start and end times based on the broadcasting start time and the program length that are supplied from the EIT acquiring unit 51 and that are set in the EIT and, when the recording start or end time has arrived, the reservation unit 52 indicates to a reservation processor unit 53 that the recording start or end time has arrived.

The reservation processor unit 53 records the reservation program in the storage unit 21 based on the recording start and end times indicated by the reservation unit 52.

Figure 5:
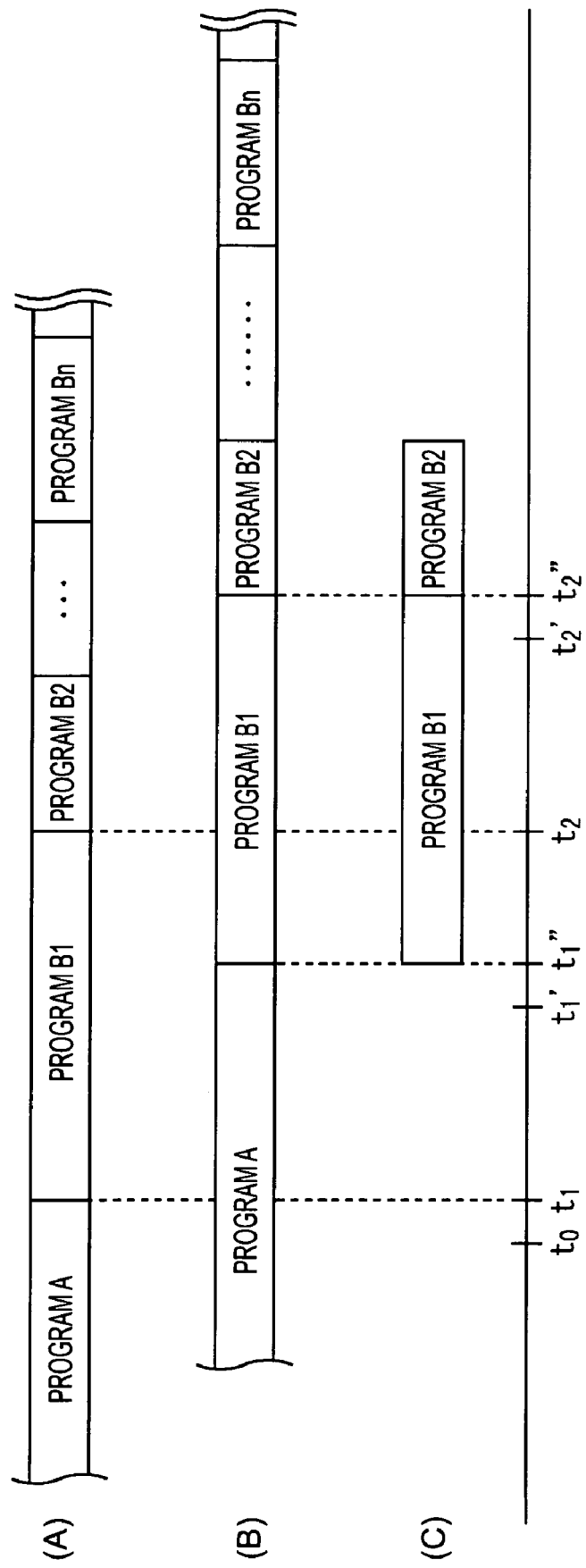
FIG. 5 illustrates the recording reservation process in FIG. 4.

FIG. 4 is a flowchart showing a recording reservation process. The recording reservation process is generally described with reference to FIG. 4 and, then, is specifically described with reference to an example shown in FIG. 5.

Referring to FIG. 4, in Step S1, the reservation unit 52 reserves a program (reservation program) specified by a user. In this example, a plurality of broadcast programs is reserved. For example, when the user operates the input unit 26 to specify the program for which the recording is reserved, the reservation unit 52 stores a channel in which the program is to be broadcasted, broadcasting start and end times of the program, and the recording start and end times corresponding to the broadcasting start and end times, which are supplied from the input unit 26.

In Step S2, the reservation unit 52 waits from the current time counted by the timer 14 until a time a predetermined time before the recording start time of the reservation program, and proceeds to Step S3 when the time the predetermined time before the recording start time has arrived.

In Step S3, the reservation unit 52 extracts an EIT[P] from the acquired EIT supplied from the EIT acquiring unit 51. In Step S4, the reservation unit 52 determines whether the ID of the reservation program is set in the EIT[P] (determines whether the program currently broadcasted is the reservation program). If the reservation unit 52 determines that the ID of the reservation program is not set in the EIT[P] (determines that the program currently broadcasted is not the reservation program), the reservation unit 52 proceeds to Step S5.

In Step S5, the reservation unit 52 determines whether the recording of all the reservation programs has been started. If the reservation unit 52 determines that there are reservation programs for which the recording has not been started, the reservation unit 52 proceeds to Step S6.

In Step S6, the reservation unit 52 extracts an EIT[F] from the acquired EIT supplied from the EIT acquiring unit 51. In Step S7, the reservation unit 52 determines whether the ID of the reservation program is set in the EIT[F]. If the reservation unit 52 determines that the ID of the reservation program is not set in the EIT[F], the reservation unit 52 goes back to Step S6 to extract an EIT[F] again. If the reservation unit 52 determines that the ID of the reservation program is set in the EIT[F], the reservation unit 52 proceeds to Step S8.

In other words, the reservation unit 52 waits until the EIT [F] having the ID of the reservation program set therein is obtained in Steps S6 and S7 and, when the EIT[F] is obtained, the reservation unit 52 proceeds to Step S8.

In Step S8, the reservation unit 52 refers to the broadcasting start time, the program length, etc. (hereinafter referred to as time information) of the reservation program, set in the EIT [F], to determine whether the information concerning the reservation program has been changed. If the reservation unit 52 determines that the information concerning the reservation program has been changed (for example, when the broadcasting start time of the reservation program is delayed), the reservation unit 52 proceeds to Step S9.

In Step S9, the reservation unit 52 changes the recording start and end times of the reservation program, stored in the reservation, based on the broadcasting start time and the program length of the reservation program, set in the EIT[F].

If the reservation unit 52 determines in Step S8 that the information concerning the reservation program has not been changed or after the reservation unit 52 changes the recording start and end times in Step S9, the reservation unit 52 goes back to Step S2 to continue the subsequent steps.

If the reservation unit 52 determines in Step S4 that the ID of the reservation program is set in the EIT[P] (if the reservation program is being broadcasted), the reservation unit 52 proceeds to Step S10. In Step S10, the reservation unit 52 indicates to the reservation processor unit 53 that the ID of the reservation program is set in the EIT[P], and the reservation processor unit 53 starts to record the reservation program. In this manner, the recording of the program (reservation program) whose ID is set in the EIT[P] is started.

In Step S11, the reservation unit 52 determines whether the recording of all the reservation programs has been started. If the reservation unit 52 determines that there are reservation programs for which the recording has not been started, the reservation unit 52 proceeds to Step S12.

In Step S12, the reservation unit 52 extracts an EIT[F]. In Step S13, the reservation unit 52 determines whether the ID of the reservation program is set in the EIT[F]. If the reservation unit 52 determines that the ID of the reservation program is not set in the EIT[F], the reservation unit 52 goes back to Step S12 to extract an EIT[F] again. If the reservation unit 52 determines that the ID of the reservation program is set in the EIT[F], the reservation unit 52 proceeds to Step S14.

In other words, the reservation unit 52 waits until the EIT [F] having the ID of the reservation program set therein is obtained in Steps S12 and S13 and, when the EIT[F] is obtained, the reservation unit 52 proceeds to Step S14.

In Step S14, the reservation unit 52 refers to the broadcasting start time, the program length, etc. (the time information) of the reservation program, set in the EIT[F], to determine whether the information concerning the reservation program has been changed. If the reservation unit 52 determines that the information concerning the reservation program has been changed (for example, when the broadcasting start time of the reservation program is delayed), the reservation unit 52 proceeds to Step S15.

In Step S15, the reservation unit 52 changes the recording start and end times of the reservation program, based on the broadcasting start time and the program length of the reservation program, set in the EIT[F].

If the reservation unit 52 determines in Step S14 that the information concerning the reservation program has not been changed or after the reservation unit 52 changes the recording start and end times in Step S15, the reservation unit 52 goes back to Step S2 to continue the subsequent steps.

If the reservation unit 52 determines in Step S11 that the recording of all the reservation programs has been started, the reservation unit 52 terminates the process.

The recording reservation process will be specifically described with reference to the example shown in FIG. 5(A). In this example, in Step S1, the process reserves recording of programs B1 and B2 in a predetermined channel in which programs are to be broadcasted according to a schedule shown in FIG. 5(A). However, since a program A precedent to the program B1 is extended as shown in FIG. 5(B), the broadcasting start time of the program B1 is changed from a time t1 to a time t1" and the broadcasting start time of a program B2 is changed from a time t2 to a time t2".

In Step S2, the process waits from the current time counted by the timer 14 until a time t0 a predetermined time before a recording start time t1 of the program B1, which is to be broadcasted first among the reservation programs.

When the time t0 the predetermined time before the recording start time t1 of the program B1 has arrived, in Step S3, the process extracts an EIT[P]. In Step S4, the process determines whether the ID of the program B1 is set in the EIT[P].

Since the broadcasting time of the program A precedent to the program B1 is extended to the time t1" and the program A is being broadcasted until the time t1" in this example, the ID of the program A is set and the ID of the program B1 is not set in the EIT[P] until the time t1". Accordingly, the determination in Step S4 is negative immediately after the time t0.

The process proceeds to Step S5 to determine whether the recording of all the reservation programs has been started. Since the recording of the program B1 and the program B2 has not been started, the determination in Step S5 is negative and the process proceeds to Step S6.

The process waits until the EIT[F] having the ID of the program B1 set therein is obtained in Steps S6 and S7. When the EIT[F] is obtained, the process proceeds to Step S8.

Normally, when the program currently being broadcasted is extended, the EIT[F] indicating the information concerning the subsequent program is once made indeterminate and is changed (fixed) to the content of a program to be subsequently broadcasted at predetermined timing. Since the program B1 is fixed as the program to be broadcasted subsequent to the program A a predetermined time after the time t1 in this example, the process waits for the predetermined time until the EIT[F] having the ID of the program B1 set therein is obtained.

When the EIT[F] having the ID of the program B1 set therein is obtained, the process proceeds to Step S9 through Step S8 because the broadcasting start time (the time information) has been changed. In Step S9, the recording start time of the program B1 is changed to the time t1" based on the broadcasting start time t1" (the changed time) and the program length of the program B1, set in the EIT[F].

The process goes back to Step S2 and waits until a time t1' immediately before the time t1".

When the time t1' has arrived, the process proceeds to Step S3 to extract an EIT[P]. In Step S4, the process determines whether the ID of the program B1 is set in the EIT[P].

Since the ID of the program B1 is set in the EIT[P] at this timing, the determination in Step S4 is affirmative.

In Step S10, the process starts to record the program B1, as shown in FIG. 5(C).

In Step S11, the process determines whether the recording of both the programs B1 and B2 has been started. Since the recording of the program B2 has not been started yet, the process proceeds to Step S12 to extract an EIT[F].

The process waits until the EIT[F] having the ID of the program B2 set therein is obtained in Steps S12 and S13. When the EIT[F] is obtained, the process proceeds to Step S15 through Step S14.

In Step S15, the recording start time of the program B2 is changed to the time t2" based on the broadcasting start time t2" (the changed time) and the program length of the program B2, set in the EIT[F].

The process goes back to Step S2 and waits from the current time counted by the timer 14 until a time t2' immediately before the recording start time t2" of the program B2 (the recording of the program B1, started in Step S10, is continued during this waiting time). When the recording start time t2' has arrived, the process proceeds to Step S3 to extract an EIT[P]. In Step S4, the process determines whether the ID of the program B2 is set in the EIT[P].

Since the ID of the program B2 is set in the EIT[P] at this timing, the determination in Step S4 is affirmative.

In Step S10, the process starts to record the program B2, as shown in FIG. 5(C).

In Step S11, the process determines whether the recording of both the programs B1 and B2 has been started. Since the recording of the subsequent programs B1 and B2 has been started, the determination in Step S11 is affirmative and the process terminates.

When there are reservation programs for which the recording has not been started, the process refers to the EIT[F] to change the recording start times, etc. of the corresponding programs in the manner described above. As a result, it is possible to appropriately record a plurality of programs.

Although the reservation of the recording is exemplified above, the present invention is not limited to the reservation of the recording and is applicable to any process as long as it is to be started at a predetermined time.

Although the EIT[F] and the EIT[P] are used in the above description, for example, an EIT [scheduled] indicating TV programs for one week may be used.

The series of processing described above may be performed by hardware or may be performed by software. When the series of processing is performed by software, the programs in the software are installed in a computer that executes the programs to functionally realize the recording-playback apparatus 1 described above.

In the specification, the steps describing the programs supplied from the recording medium may be performed in time series in the described order, or may be performed in parallel or individually.

It should be understood by those skilled in the art that various modifications, combinations, sub-combinations and alterations may occur depending on design requirements and other factors insofar as they are within the scope of the appended claims or the equivalents thereof.

What is claimed is:

1. An information processing apparatus comprising:
a reservation unit for reserving, from a broadcast stream, a first broadcast program and a second broadcast program subsequent to the first broadcast program for recording;
an acquiring unit for acquiring program information for the broadcast stream; and
a recording unit for:
    starting recording of the first broadcast program based on a first start time for the first broadcast program included in the acquired program information;
    determining, after starting recording of the first broadcast program, whether the second broadcast program remains to be recorded, and, when the second broadcast program does remain to be recorded, determining at a predetermined time prior to a second start time for the second broadcast if the acquired program information includes an ID corresponding to the second broadcast program; and
    based on the determination that the acquired program information does include the ID corresponding to the second broadcast program then:
        obtaining a modified start time for the second broadcast program by extracting a changed broadcasting start time set in the acquired program information; and
        changing recording conditions for the second broadcast program based on the modified start time such that recording of the second broadcast program begins following completion of recording of the first broadcast program.

2. The information processing apparatus according to claim 1, wherein the program information includes at least information concerning a first broadcast program being currently broadcasted and information concerning a second broadcast program to be broadcasted subsequent to the first broadcast program.

3. The information processing apparatus according to claim 1, wherein the first broadcast program is a digital television broadcast program.

4. The information processing apparatus according to claim 1, wherein the program information is program information concerning a digital television broadcast program.

5. An information processing method comprising:
reserving, from a broadcast stream, a first broadcast program and a second broadcast program subsequent to the first broadcast program for recording;
acquiring program information for the broadcast stream;
starting recording of the first broadcast program based on a first start time for the first broadcast program included in the acquired program information;
determining, after starting recording of the first broadcast program, whether the second broadcast program remains to be recorded, and, when the second broadcast program does remain to be recorded, at a predetermined time prior to a second start time for the second broadcast if the acquired program information includes an ID corresponding to the second broadcast program; and
based on the determination that the acquired program information does include the ID corresponding to the second broadcast program then:
    obtaining a modified start time for the second broadcast program by extracting a changed broadcasting start time of the second broadcast program set in the acquired program information; and
    changing recording conditions for the second broadcast program based on the modified start time such that recording of the second broadcast program begins following completion of recording of the first broadcast program.

6. A non-transitory computer-readable storage medium storing a program which, when executed by a processor, causes a computer to perform a method comprising:

reserving, from a broadcast stream, a first broadcast program and a second broadcast program subsequent to the first broadcast program for recording;

acquiring program information for the broadcast stream;

starting recording of the first broadcast program based on a first start time for the first broadcast program included in the acquired program information;

determining, after starting recording of the first broadcast program, whether the second broadcast program remains to be recorded, and, when the second broadcast program does remain to be recorded, determining at a predetermined time prior to a second start time for the second broadcast if the acquired program information includes an ID corresponding to the second broadcast program; and based on the determination that the acquired program information does include the ID corresponding to the second broadcast program then:

obtaining a modified start time for the second broadcast program by extracting a changed broadcasting start time of the second broadcast program set in the acquired program information; and changing recording conditions for the second broadcast program based on the modified start time such that recording of the second broadcast program begins following completion of recording of the first broadcast program.

* * * * *